United States Patent [19]

Kleemann et al.

[11] 3,947,166

[45] Mar. 30, 1976

[54] AGGLOMERATION APPARATUS

[75] Inventors: Thomas Kleemann; Willy Rothmayr, both of La Tour-de-Peilz, Switzerland

[73] Assignee: Societe D'Assistance Technique Pour Produits Nestle, S.A., La Tour-de-Peilz, Switzerland

[22] Filed: Oct. 9, 1973

[21] Appl. No.: 404,313

[30] Foreign Application Priority Data
Oct. 17, 1972 Switzerland.................... 15185/72

[52] U.S. Cl. .................... 425/7; 425/10; 264/12
[51] Int. Cl.² .................... A23L 1/00; A23L 2/00
[58] Field of Search ........ 425/7, 10, 222, DIG. 101; 264/12, 14

[56] References Cited
UNITED STATES PATENTS

| 3,143,428 | 8/1964 | Reimers et al. ................. 425/222 X |
|---|---|---|
| 3,271,493 | 9/1966 | Van Den Berge .................. 264/143 |
| 3,285,723 | 11/1966 | Levecque et al. ................... 425/7 X |
| 3,347,648 | 10/1967 | Krakauer et al. .................... 425/7 X |
| 3,436,792 | 4/1969 | Hench................................. 425/7 X |
| 3,752,611 | 8/1973 | Reed et al......................... 425/10 X |
| 3,771,929 | 11/1973 | Hellman et al. ........................ 425/7 |

*Primary Examiner*—Robert L. Spicer, Jr.
*Attorney, Agent, or Firm*—Watson Leavenworth Kelton & Taggart

[57] ABSTRACT

A process for agglomerating a powdered product comprises contacting the product with a current of steam and with a gaseous fluid the temperature of which is lower than the temperature of the steam. An apparatus for carrying out the process is also disclosed.

2 Claims, 2 Drawing Figures

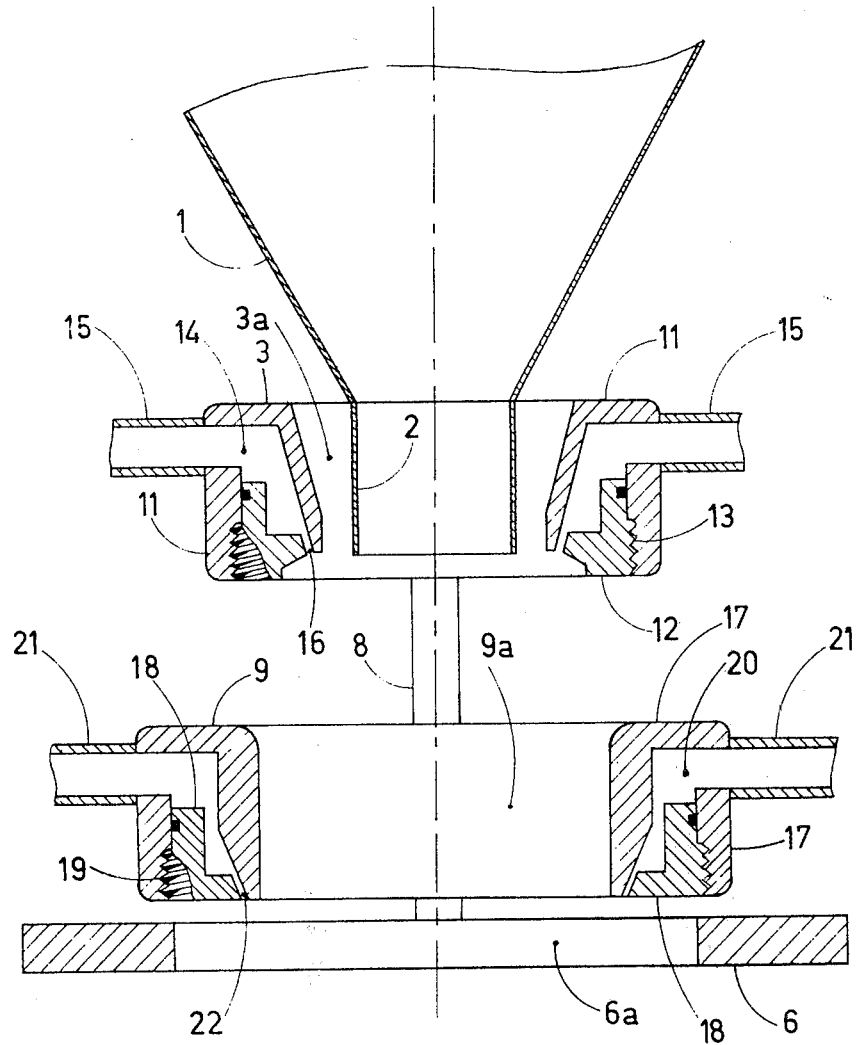
Fig_2

AGGLOMERATION APPARATUS

The present invention is concerned with the agglomeration of powdered products.

The agglomeration of dry powders, in particular food products and beverage compositions, improves certain of their properties. Thus, the agglomerated products are made up of particles of uniform size the dimensions of which may be adjusted as desired. These products, which are free from fines, i.e. particles of small dimensions, are free-flowing and have improved wettability as compared with the original powder. Moreover, agglomeration makes it possible to adjust the density of the treated product and to improve its appearance and its homogeneity.

The agglomeration of the powdered products is generally carried out in two main stages. During the first stage the particles of powder are make sticky by surface moistening and agglomerated with one another. During the second stage the agglomerates formed are dried, for example in a drying chamber.

The surface wetting of the powder particles is generally carried out with steam, preferably at a temperature sufficiently elevated (e.g. 100°–130°C) to supply sufficient water for effective moistening of the powder. It is desirable that the temperature of the powder to be wetted be as low as possible in order to promote condensation of the steam. Moreover, excess heating of the powder may impair certain properties of the product.

An object of the present invention is to provide an improved agglomeration process suitable for the treatment of large quantities of powdered product under conditions affording particularly effective moistening of the product without adversely affecting its quality.

The invention provides a process for agglomerating a powdered product which comprises contacting a current of the powdered product with a current of steam and with a current of a gaseous fluid which is at a temperature below the temperature of the steam.

The invention also provides an apparatus for carrying out the process.

Preferably, the steam is at a temperature of the order of 100° to 140°C and desirably is saturated, whereas the temperature of the gaseous fluid is advantageously in the range 10° to 40°C. The gaseous fluid is useful in preventing excessive heating of the product, and also promotes the condensation of the steam on the powder particles. Preferably, the currents of steam and of gaseous fluid, at least over the first parts of their trajectories, lie on coaxial surfaces of revolution of which the axis is substantially parallel to that of the current of powder. It is particularly preferred to introduce the current of gaseous fluid between the current of steam and the moving powder, with the current of steam converging towards the powder. Under these conditions the moistened particles or those in the process of being moistened are located in a zone of turbulent flow in which contact between the particles and the steam and the gaseous fluid is improved and contact between powder particles themselves is increased. The gaseous fluid may be chosen having regard to the characteristics of the product to be agglomerated and the temperature used. Preferably, the gaseous fluid is a gas or a mixture of gases which is substantially inert towards the powdered product, for example nitrogen, carbon dioxide or air.

Depending on the nature of the powder being treated and on the desired characteristics of the agglomerated product, the agglomeration technique described above may be repeated on the same batch of powder.

Following agglomeration and depending on the moisture uptake during this operation, the product may be dried to the desired moisture content, for example in a drying tower.

The process of the invention may advantageously be carried out in an apparatus which comprises:

a. at least one hollow member having a central transverse opening forming a nozzle and defining a chamber which communicates with a steam feed duct and which terminates in at least one steam ejection orifice for directing a current of steam which converges towards the axis of the central opening, and b. a supply duct for powdered product located within the central opening of the hollow member to provide a passage for gaseous fluid between the outer wall of the duct and the inner wall of the central opening.

Preferably, the hollow member is circular and the steam ejection orifice may be an annular opening or may be provided by a series of spaced holes, preferably spaced at regular intervals around the central opening.

The duct for supplying powdered product may constitute the lower portion of a feed hopper or a funnel, or it may be fed by any other suitable means. The passage between the supply duct and the inside wall of the central opening of the hollow member provides for isolation of the powder from the hollow member which is heated by the steam. This passage is preferably annular in shape, and may be connected with a chamber containing a gas such as nitrogen or carbon dioxide at the desired temperature. It may also be in communication with the ambient atmosphere. In a particularly preferred embodiment of the apparatus, the steam ejection orifice directs a current of steam into the central opening which produces a depression so that ambient air is aspired into the passage between the powder supply duct and the inner wall of the central opening.

If desired, two or more of the hollow members described above may be mounted above each other, on a common axis, with each member being separated from its neighbour by a space admitting gaseous fluid. Using this arrangement, the product is subjected to successive agglomerations and passes through a cool zone between each, which permits control and adjustment of physical characteristics of the final product such as its density and its colour.

One form of the apparatus according to the invention is shown by way of example in the accompanying drawings, in which:

FIG. 2 is a section taken along II-II of FIG. 1.

Figure 1:
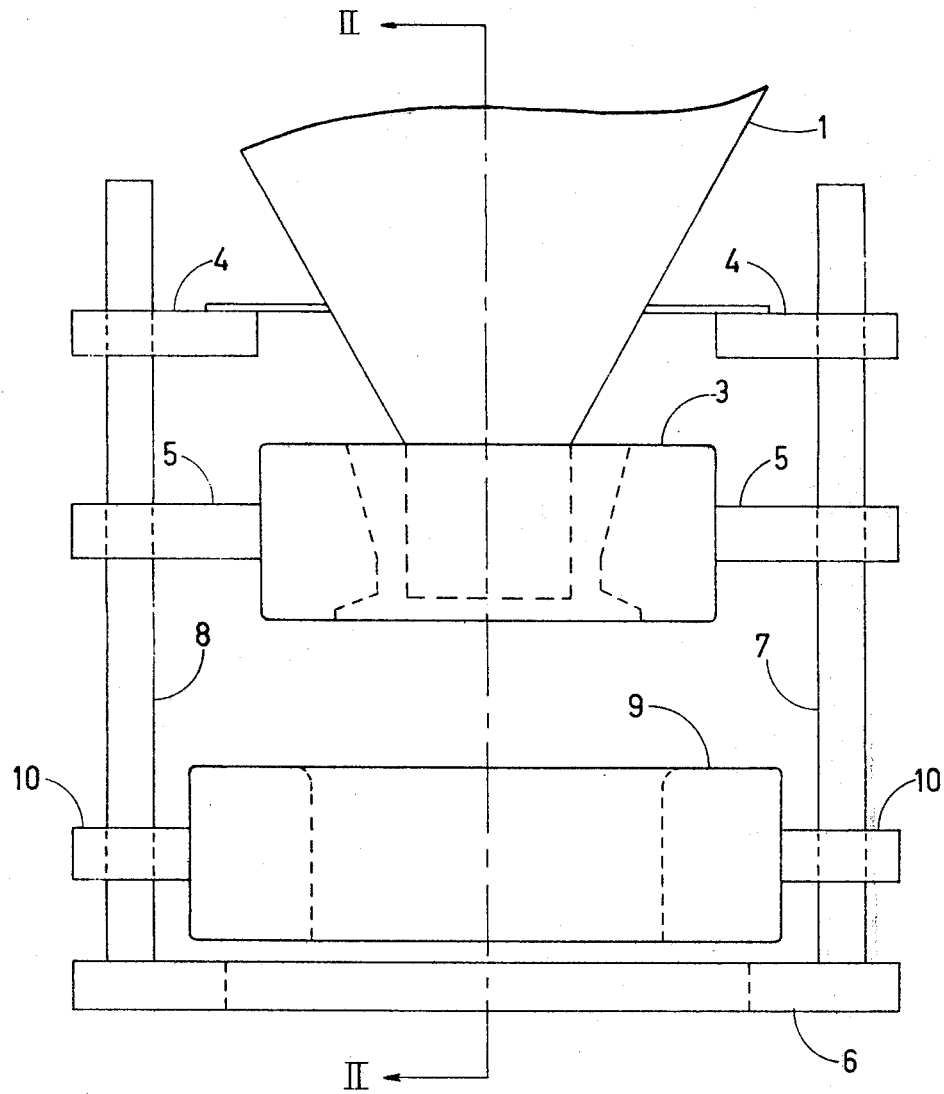
FIG. 1 is a side view of the apparatus.

As shown in FIGS. 1 and 2, the agglomeration apparatus comprises a hopper 1 for feeding the powdered product, having a lower cylindrical extremity or supply duct 2 located within the central opening 3a of the annular hollow member 3.

The hopper 1 and the member 3 are supported on brackets 4 and 5 which are adjustably mounted on a frame made up of two uprights 7 and 8 supported by a base plate 6 having an opening 6a. The apparatus also comprises a second annular hopper member 9 positioned coaxially with respect to the hopper 1 and the member 3 and separated from the member 3 by a free space. This member 9 is also attached adjustably to the uprights 7 and 8 by way of the brackets 10.

The member 3 is made up of two annular wall parts 11 and 12 screwed together at 13, and these parts define a central opening 3a and an annular chamber 14. This chamber is supplied with steam through two diametrically opposed pipes 15, and has a lower annular opening defining a steam ejection orifice 16. The orifice 16, the size of which may be adjusted by screwing the part 12 into part 11 to a greater or lesser extent, has a profile which converges towards the axis of the opening 3a.

Moreover, the respective dimensions of the hopper 1, its lower extremity 2 and the opening 3a are such that the hopper and its end 2 are separated from the member 3 by an annular space permitting ambient air to pass.

The second hollow member 9 is likewise made up of two parts 17 and 18 screwed together at 19 and defining a central opening 9a and an annular chamber 20. The chamber 20, supplied with steam through two diametrically opposed pipes 21, terminates in the lower portion of the member 9 in an annular steam ejection orifice 22. The size of this opening may likewise be adjusted by screwing the part 18 into the part 17 to a greater or lesser extent, and it converges towards the axis of the central opening 9a.

The apparatus is generally mounted vertically on top of a drying chamber. The powder to be agglomerated falls from the hopper by gravity and passes through the central openings of the members 3 and 9, whilst steam, preferably saturated, is supplied to the chambers 14 and 20. At the base of the member 3 the steam forms a hollow cone which contacts the powder, creating at the same time a depression within the cone whereby ambient air is drawn into the annular space between the extremity 2 of the hopper 1 and the inside wall of the central opening 3a. The powder thus comes into contact with the steam under turbulent conditions, as well as with a current of cool air which promotes condensation of the steam on the powder particles and prevents overheating of the product.

After undergoing a primary agglomeration, the powder falls into the cental opening of the member 9 and is subjected to a secondary agglomeration under analogous conditions, with a second current of fresh air being drawn into the opening 9a from the space separating the members 3 and 9.

The temperature, pressure and rate of flow may be adjusted having regard to the type of material being agglomerated and the properties desired in the finished product. Likewise, the spacing between the hollow members and the sizes of the steam ejection orifices may be varied.

The process and apparatus in accordance with the invention may be used for the agglomeration of a large number of powdered materials, more particularly for the agglomeration of edible products such as powdered extracts of coffee or of tea, or powdered beverage compositions containing, for example, sugar, cocoa and/or milk solids.

The invention is illustrated by the following examples, in which the percentages are given on a weight basis.

EXAMPLE 1

A simulated orange juice composition containing 80% sucrose, 8% dehydrated natural orange juice, 7% citric acid, 3% clouding agent and colourings and flavourings is agglomerated.

This powdered mixture has a mean particle size below 500 microns and a bulk density of 900 g/l.

The agglomeration is effected with an apparatus comprising a single hollow member. This has a central opening 4.5 cm in diameter and an annular steam ejection orifice with a diameter of 5 cm, a width of 1 mm and which is inclined to the axis at 20°.

This apparatus is mounted vertically at the top of a drying tower.

The powdered product is fed into the apparatus at a rate of 500 kg/hour, whilst saturated steam under a pressure of 1.2 atmospheres is supplied to the annular chamber at a temperature of 105°C and at a rate of 1200 kg/hour. The dryer is operated at an air inlet temperature of 130°C and an air outlet temperature of 100°C. The dried agglomerated product has homogeneous colour and particle size (mean diameter of the particles=2 mm) a density of 500 g/l and a moisture content of 0.7%. This product has excellent wettability and on dispersion in cold water at a concentration of 50 g/l, provides a beverage reproducing the appearance and flavour of natural orange juice.

By way of comparison, agglomeration of the same product with a conventional nozzle (i.e. without a fresh air intake) with saturated steam leads to localised fusion and the resulting agglomerate do not have a homogeneous particle size and appearance.

EXAMPLE 2

A beverage composition as described in Example 1 is agglomerated in an apparatus comprising two hollow coaxial members having the following shape characteristics:

|  | Upper member | Lower member |
| --- | --- | --- |
| Central opening diameter | 4.5 cm | 7.4 cm |
| Annular orifice diameter | 5 cm | 8 cm |
| Orifice width | 0.4 mm | 0.6 mm |
| Angle between annular orifice and axis | 20° | 15° |
| Distance between the two hollow bodies | 3 cm | |

This apparatus is mounted vertically at the top of a drying tower operated at an air inlet temperature of 130°C and an air outlet temperature of 100°C.

Saturated steam at a temperature of 106°C and a pressure of 1.25 atmospheres in supplied to the hollow members, at a rate of 1200 kg/hour. The powdered product is treated under these conditions at the rate of 500 kg/hour.

An agglomerated product having a density (in the uncompressed state) of 500 g/l is obtained, which is darker in colour than that obtained in Example 1. The moisture content is 0.3%.

The product has excellent wettability and on dispersion in cold water, at a level of 50 g/l, yields a beverage reproducing the taste and flavour of natural orange juice.

EXAMPLE 3

A chocolate beverage composition containing the following substances is agglomerated:

| | |
| --- | --- |
| Sucrose | 90 % |
| Solubilised cocoa powder containing 12% cocoa butter | 9.6% |

| | |
|---|---|
| -continued | |
| Sodium chloride | 0.4% |

This powdered mixture, of which the particles have a mean diameter between 100 and 500 microns, has a bulk density of 680 g/l. It is agglomerated in an apparatus comprising one hollow member whose characteristics are identical to those of member described in Example 1 except that the annular opening is 0.9 mm wide. As before, the apparatus is mounted vertically on a drying tower.

Saturated steam under a pressure of 1.5 atmospheres at a temperature of 111°C is supplied to the annular chamber and the drier is operated at an air inlet temperature of 150°C and an outlet temperature of 110°C.

600 kg an hour of powder are agglomerated. The product has uniform colour and particle size, and a desnity of 465 g/l with a moisture content of 1.5%. This product provides a chocolate beverage on dispersion in warm or cold water or milk at a concentration of 50 g/l.

EXAMPLE 4

The powdered composition described in Example 3 is agglomerated with an apparatus comprising two coaxial hollow members mounted vertically at the top of a hot-air drying tower (inlet temperature = 150°C, outlet temperature = 110°C).

The agglomeration is effected under the following conditions:

| | Upper member | Lower member |
|---|---|---|
| Central opening diameter | 4.5 cm | 7.4 cm |
| Annular orifice diameter | 5 cm | 8 cm |
| Orifice width | 1 mm | 1 mm |
| Angle between annular opening and axis | 20° | 15° |
| Saturated steam inlet pressure (temperature = 102°C) | 1.1 atms | 1.1 atms |

| | |
|---|---|
| -continued | |
| Distance between the members | 3 cm |

The total steam consumption is 1200 kg/hour for agglomerating 600 kg/hour of powder.

The agglomerated dried product has a density of 350 g/l and a moisture content of 1.0%. Its colour is more pronounced than that of the product prepared in Example 3.

We claim:

1. Agglomeration apparatus comprising
   a hollow annular member having an inner wall extending encirclingly about a central vertical axis and defining a central passage in said member, said central passage terminating at the lower end of said member in an opening extending transverse to said axis,
   a cylindrical supply duct received concentrically within said central passage and being spaced radially inwardly from said member inner wall for defining with said member inner wall an annular passage through which a gaseous fluid can be flowed, said hollow member having an outer wall spaced from said inner wall to define an encircling chamber, and
   a steam supply duct communicating with said chamber, said chamber terminating in an orifice adjacent said central passage transverse opening, said orifice being disposed such as to direct a current of steam in a course converging with said vertical axis, said orifice extending in an annular encircling course about said transverse opening, said hollow member comprising complemental inner and outer wall parts moveable axially one with respect to the other for selectively altering the size of said orifice.

2. An apparatus according to claim 1, comprising a further hollow member located below and on the axis of the first member, there being space between the first and further member for the passage of a gaseous fluid.

* * * * *